(12) United States Patent
Kanayama

(10) Patent No.: US 11,566,695 B2
(45) Date of Patent: Jan. 31, 2023

(54) UNIT-TYPE STRAIN WAVE GEARING DEVICE

(71) Applicant: HARMONIC DRIVE SYSTEMS INC., Tokyo (JP)

(72) Inventor: Naoki Kanayama, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 178 days.

(21) Appl. No.: 17/281,736

(22) PCT Filed: Nov. 16, 2018

(86) PCT No.: PCT/JP2018/042561
§ 371 (c)(1),
(2) Date: Mar. 31, 2021

(87) PCT Pub. No.: WO2020/100309
PCT Pub. Date: May 22, 2020

(65) Prior Publication Data
US 2021/0396303 A1     Dec. 23, 2021

(51) Int. Cl.
*F16H 49/00*     (2006.01)
*F16H 57/04*     (2010.01)

(52) U.S. Cl.
CPC ....... *F16H 49/001* (2013.01); *F16H 57/0464* (2013.01); *F16H 57/0471* (2013.01)

(58) Field of Classification Search
CPC .................................................. F16H 49/001
(Continued)

(56) References Cited

U.S. PATENT DOCUMENTS 11,441,660 B2 *   9/2022   Miyazawa ............ F16H 49/001
2008/0245172 A1   10/2008   Kiyosawa et al.
(Continued)

FOREIGN PATENT DOCUMENTS

JP     S6012756 U     1/1985
JP     H0291238 U     7/1990
(Continued)

OTHER PUBLICATIONS

International Search Report (PCT/ISA/210) and Written Opinion (PCT/ISA/237) dated Feb. 19, 2019, by the Japanese Patent Office as the International Searching Authority for International Application No. PCT/JP2018/042561. (9 pages).

*Primary Examiner* — Ha Dinh Ho
(74) *Attorney, Agent, or Firm* — Buchanan Ingersoll & Rooney PC

(57) ABSTRACT

A unit-type strain wave gearing device provided with a cross roller bearing that supports an internally toothed gear and an externally toothed gear in a state in which both gears can rotate relative to each other, and a meshing section of both gears is lubricated with grease. A gap by which the meshing section and the cross roller bearing raceway groove communicate is formed between the inner ring of the cross roller bearing and the external gear. Due to the pump effect caused by deflection of the external gear, grease is pushed from the meshing section to the gap. Some grease is returned to the inner space of the externally toothed gear via a grease-flowing hole that penetrates the diaphragm of the external gear. Thus, leakage of grease from an oil seal of the cross roller bearing to the unit side can be controlled.

2 Claims, 4 Drawing Sheets

(58) Field of Classification Search
USPC .......................................................... 74/640
See application file for complete search history.

(56) References Cited

U.S. PATENT DOCUMENTS

| | | | | |
|---|---|---|---|---|
| 2019/0186599 A1* | 6/2019 | Tang | ......................... | F16H 1/32 |
| 2020/0284333 A1* | 9/2020 | Kiyosawa | ............. | F16H 49/001 |
| 2021/0396303 A1* | 12/2021 | Kanayama | .......... | F16H 57/0471 |
| 2021/0404544 A1* | 12/2021 | Kimura | ................. | F16C 19/361 |

FOREIGN PATENT DOCUMENTS

| | | |
|---|---|---|
| JP | 2008223800 A | 9/2008 |
| JP | 4877804 B2 | 2/2012 |
| WO | 2014091522 A1 | 6/2014 |
| WO | 2014203293 A1 | 12/2014 |

* cited by examiner

UNIT-TYPE STRAIN WAVE GEARING DEVICE

TECHNICAL FIELD

The present invention relates to a unit-type strain wave gearing device in which a bearing is provided to support a rigid internally toothed gear and a flexible externally toothed gear in a relative rotatable state, and particularly relates to a unit-type strain wave gearing device in which a meshing section between the internally toothed gear and the externally toothed gear is lubricated by grease.

BACKGROUND ART

As a unit-type strain wave gearing device, there has been known one that is provided with a rigid internally toothed gear, a flexible externally toothed gear, and a bearing such as a cross roller bearing et al., to support both gears in a relative rotatable state. Strain wave gearing devices of this configuration are described in Patent documents 1 and 2.

In a strain wave gearing device described in Patent document 1, a cross roller bearing is arranged in a state of surrounding a circular cylindrical barrel part of a top-hat-shaped externally toothed gear. The cross roller bearing has an outer ring, which is fastened to the annular boss formed in the outer peripheral edge of a diaphragm of an externally toothed gear, and an inner ring which is fixed to an internally toothed gear. A certain gap is formed between the inner ring of the cross roller bearing and the diaphragm and cylindrical barrel part of the externally toothed gear so that both members do not interfere with each other. The gap is communicated with a meshing section between the internally toothed gear and the externally toothed gear and is also communicated with a raceway groove between the inner and outer rings of the cross roller bearing. In a strain wave gearing device described in Patent document 2, a cross roller bearing is arranged in a state of surrounding the circular cylindrical barrel part of a cup-shaped externally toothed gear. There is formed a prescribed gap between the inner ring of the cross roller bearing and the diaphragm and cylindrical barrel part of the externally toothed gear. The gap is communicated with a meshing section between the internally toothed gear and the externally toothed gear and is communicated with the raceway groove of the cross roller bearing.

On the other hand, in Patent document 3, it has been proposed that an oil supply hole is formed in an externally toothed gear in order to allow lubricant oil provided from the outside of the strain wave gearing device to flow into the inside of the strain wave gearing device.

PRIOR ART LITERATURE

Patent Documents

Patent Document 1: WO 2014/091522 A1
Patent Document 2: WO 2014/203293 A1
Patent Document 3: JP 4877804 B

SUMMARY OF THE INVENTION

Problems to be Solved by the Invention

In a unit-type strain wave gearing device, a meshing section between two gears is sometimes lubricated by grease which is coated on or filled in the meshing section beforehand. In the meshing section, the cylindrical barrel part of the externally toothed gear, in which external teeth are formed, is repeatedly flexed in a radial direction by a wave generator. Due to the pump effect caused by deflection of the external gear in the radial direction, grease is pushed from the meshing section which is lubricated by the grease. Grease pushed out therefrom flows into a gap formed between the cylindrical barrel part of the externally toothed gear and the inner ring of a cross roller bearing.

The grease, which was flowed into the gap, passes through the gap and flows into the raceway groove formed between the inner and outer rings of the cross roller bearing. A gap formed between the inner and outer rings of the cross roller bearing, which are exposed to the unit outside, is typically sealed by an oil seal. However, when the inner pressure of the raceway groove increases caused by the grease flowed into the raceway groove, the grease may be leaked out to the outside through the oil seal.

In view of the above, an object of the present invention is to provide a unit-type strain wave gearing device which is able to prevent or suppress leakage of grease to the outside of the unit through an oil seal of a bearing for supporting an internally toothed gear and an externally toothed gear in a relatively rotatable state.

Means of Solving the Problems

In order to solve the above problems, a unit-type strain wave gearing device of the present invention has:
a rigid internally toothed gear;
a flexible externally toothed gear;
a bearing for supporting the internally toothed gear and the externally toothed gear in a relative rotatable state;
a wave generator;
grease which is coated on or filled in a meshing section of the internally toothed gear and the externally toothed gear;
a gap which is formed between the bearing and the externally toothed gear and which communicates with a raceway groove between inner and outer rings of the bearing and with the meshing section;
an oil seal for sealing a space between the inner ring and the outer ring, the space being exposed to the outside; and
a grease-flowing hole formed in the externally toothed gear,
wherein the externally toothed gear is provided with: a cylindrical barrel part capable of flexing in a radial direction and disposed coaxially inside the internally toothed gear; and a discoid diaphragm extending radially outward or inward from one end of the cylindrical barrel part, in which external teeth are formed in an outer peripheral surface portion of the cylindrical barrel part, the outer peripheral surface portion facing internal teeth of the internally toothed gear;
the wave generator is disposed coaxially inside the cylindrical barrel part of the externally toothed gear and is configured to repeatedly flex the cylindrical barrel part in the radial direction so as to move a position of the external teeth meshing with the internal teeth in a circumferential direction; and
the grease-flowing hole penetrates at least one of the cylindrical barrel part and the diaphragm to communicate between the gap and an inner space of the cylindrical barrel part.

Grease, which is coated on or filled in the meshing section of the two gears is forced to push out toward the diaphragm due to the pump effect caused by repeating radial deflection of the cylindrical barrel part of the externally toothed gear by the wave generator. The pushed-out grease flows into the gap between the cylindrical barrel part of the externally toothed gear and the bearing. This gap communicates with the raceway groove of the bearing and also with the inner space of the externally toothed gear via the grease-flowing hole formed in the externally toothed gear. Accordingly, part of the grease pushed out from the meshing section flows into the inner space of the externally toothed gear via the grease-flowing hole, whereby reducing the amount of grease flowing into the raceway groove via the gap. Since the amount of grease, which reaches the raceway groove, can therefore be reduced, it is possible to prevent or suppress leakage of grease from the raceway groove to the outside of the device through the oil seal.

Here, the grease-flowing hole may be formed in the diaphragm, for example, at equiangular intervals or different angular intervals in the circumferential direction thereof. The grease-flowing hole can be a through hole of circular, oval, polygonal or other shape.

MODE FOR CARRYING OUT THE INVENTION

With reference to the drawings, embodiments of a unit-type strain wave gearing device according to the present invention will be described. It is noted that the present invention is not limited to the embodiments described below.

Embodiment 1

Figure 1A:
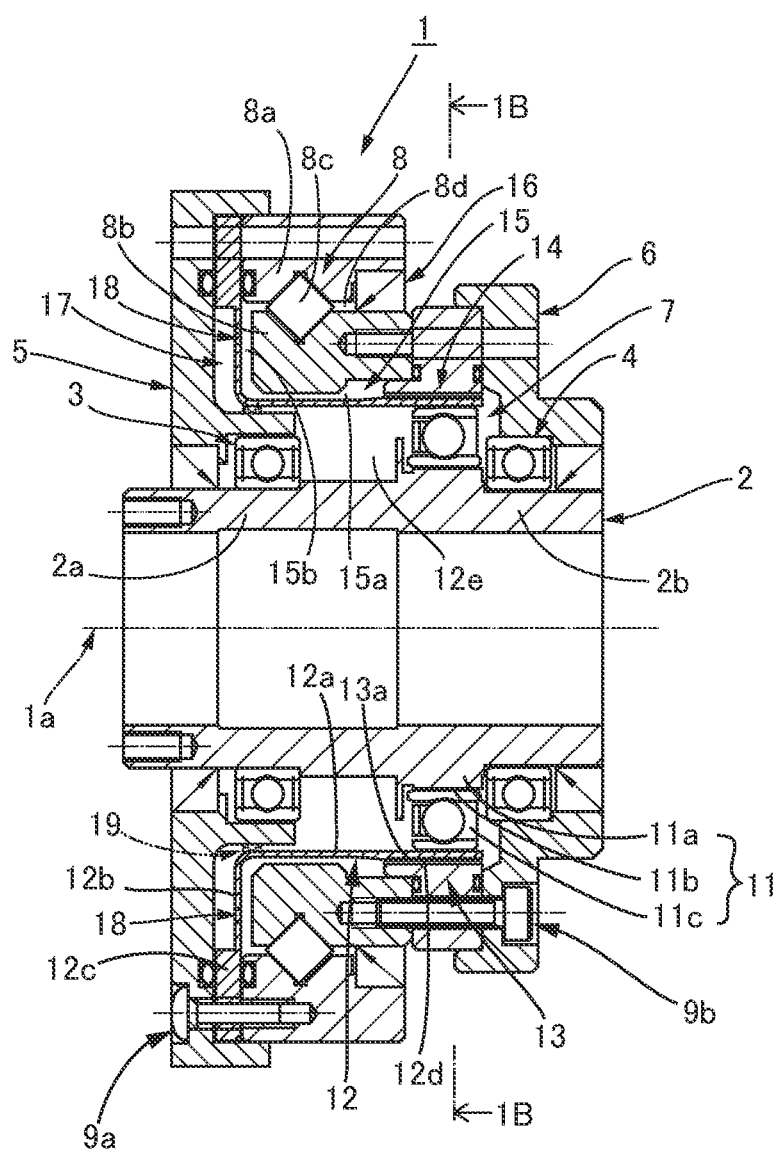
FIG. 1A is a schematic longitudinal cross-sectional view showing a unit-type strain wave gearing device according to Embodiment 1 of the present invention.
Figure 1B:
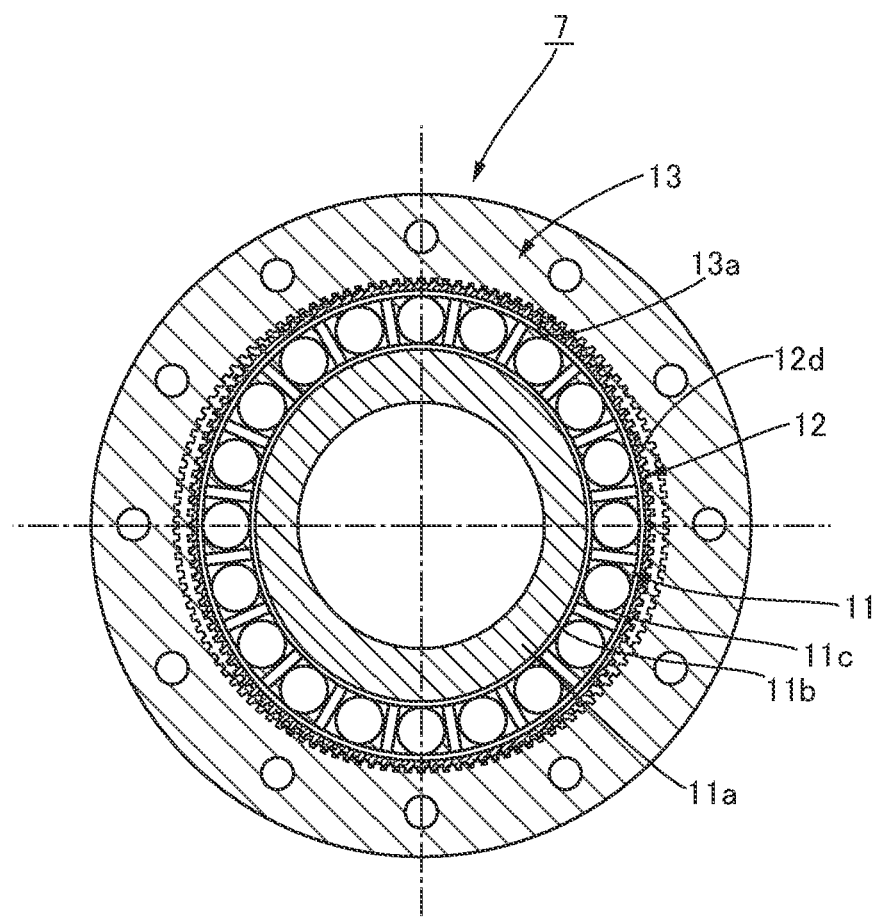
FIG. 1B is a schematic lateral cross-sectional view showing a portion of the unit-type strain wave gearing device cut along line 1B-1B of FIG. 1A.
Figure 1C:
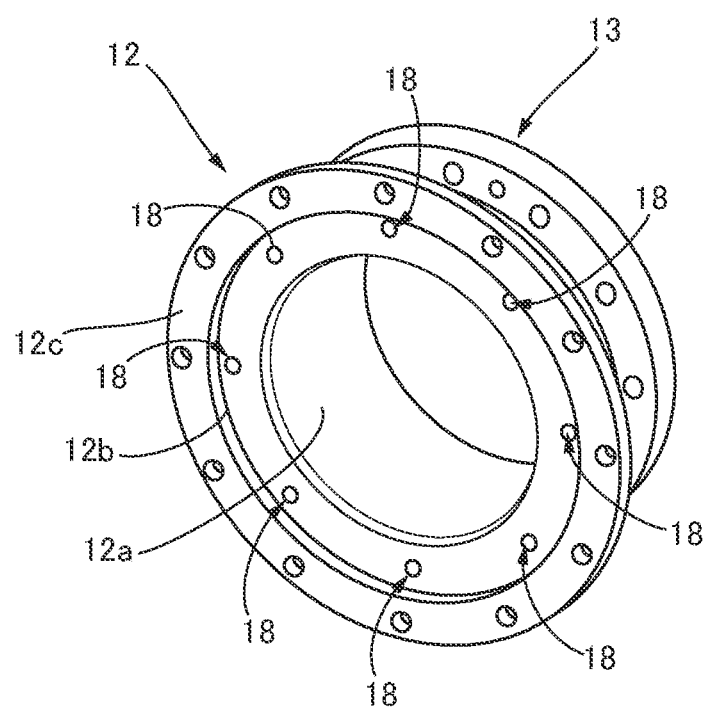
FIG. 1C is a perspective view showing an internally toothed gear and a top-hat-shaped externally toothed gear of the unit-type strain wave gearing device of FIG. 1A.

FIG. 1A is a schematic longitudinal cross-sectional view showing a unit-type strain wave gearing device according to Embodiment 1 of the present invention, FIG. 1B is a schematic lateral cross-sectional view showing a portion of the unit-type strain wave gearing device cut along line 1B-1B of FIG. 1A, and FIG. 1C is a perspective view showing an internally toothed gear and an externally toothed gear. A unit-type strain wave gearing device 1 (hereinafter simply refers to as a "strain wave gearing device 1") is provided with a hollow input shaft 2, a first input-shaft bearing 3, a second input-shaft bearing 4, a first unit end plate 5, a second unit end plate 6, a strain wave gearing mechanism 7, and a cross roller bearing 8.

The first unit end plate 5 supports one end or a first shaft end part 2a of the hollow input shaft 2 in a rotatable state via the first input-shaft bearing 3. The second unit end plate 6 supports the other end or a second shaft end part 2b of the hollow input shaft 2 in a rotatable state via the second input-shaft bearing 4. The strain wave gearing mechanism 7 is assembled between the first unit end plate 5 and the second unit end plate 6 in a state of surrounding the hollow input shaft 2.

The strain wave gearing mechanism 7 is provided with a wave generator 11 integrally rotatable with the hollow input shaft 2, a flexible externally toothed gear 12 which is flexed into a non-circular shape by the wave generator 11, and a rigid internally toothed gear 13 which is partially meshed with the externally toothed gear 12. In this embodiment, the externally toothed gear 12 is flexed into an elliptical shape by the wave generator 11.

The wave generator 11 is provided with an elliptical-contoured plug portion 11a integrally formed in the hollow input shaft 2 and a wave bearing 11c mounted on an elliptical outer peripheral surface 11b of the plug portion 11a. The wave bearing 11c is provided with inner and outer rings which are flexible in the radial direction and are flexed into an elliptical shape by the plug portion 11a.

The externally toothed gear 12 is of a top-hat shape and is provided with: a cylindrical barrel part 12a flexible in the radial direction; an annular diaphragm 12b extending outward in the radial direction from an end of the circular cylindrical barrel part 12a on the side of the first unit end plate 5; an annular rigid boss 12c formed as a continuation from the outer peripheral edge of the diaphragm 12b; and external teeth 12d formed in the outer peripheral surface portion of the cylindrical barrel part 12a on the side of the second unit end plate 6. The wave generator 11 is located on an inner side of the section of the cylindrical barrel part 12a where the external teeth 12d are formed, this section being flexed elliptically by the wave generator 11. The external teeth 12d are meshed with the internal teeth 13a of the internally toothed gear 13 on both end positions of the major axis of the elliptically flexed cylindrical barrel part 12a. The meshing section 14 of the external teeth 12d and the internal teeth 13a is lubricated by grease. The meshing section 14 is coated or filled with a predetermined amount of grease (not shown) beforehand. In addition, the inner space 12e of the externally toothed gear 12 is also filled with grease, by which the sliding portion between the externally toothed gear 12 and the wave generator 11, and the wave bearing 11c and other portions of the wave generator 11 are lubricated.

The cross roller bearing 8 is disposed in a state of surrounding the circular cylindrical barrel part 12a of the externally toothed gear 12. When viewed along the direction of the center axis line 1a, the cross roller bearing 8 is disposed between the internally toothed gear 13 and the diaphragm 12b and boss 12c of the externally toothed gear 12. The outer ring 8a of the cross roller bearing 8 is fixed to the first unit end plate 5 by a plurality of bolts 9a in a manner sandwiching the boss 12c. The inner ring 8b thereof is fixed to the internally toothed gear 13 on the side of the second unit end plate 6 by a plurality of bolts 9b. The externally toothed gear 12 fixed to the first unit end plate 5 and the internally toothed gear 13 fixed to the second unit end plate 6 are made to be a state in which they are rotatable relative to each other by the cross roller bearing 8.

A gap 15 is formed between the externally toothed gear 12 and the cross roller bearing 8. The gap 15 includes a first gap portion 15a communicating with the meshing section 14 between the external teeth 12d and the internal teeth 13a. The gap 15 also includes a second gap portion 15b communicating with an annular raceway groove 8c between the outer ring 8a and the inner ring 8b of the cross roller bearing 8. The first gap portion 15a is formed between the outer peripheral surface of the cylindrical barrel part 12a of the externally toothed gear 12 and the inner peripheral surface of the inner ring 8b, and extends in the direction of the center axis line 1a along the circular cylindrical barrel part 12a.

The second gap portion 15b is formed between the diaphragm 12b and the annular end face of the inner ring 8b and extends in the radial direction along the diaphragm 12b. The first gap portion 15a has one end communicating with the meshing section 14 and another end communicating with the radial inner end of the second gap portion 15b. The radial outer end of the second gap portion 15b is communicated with the raceway groove 8c through a gap between the outer ring 8a and the inner ring 8b. Rollers are inserted into the raceway groove 8c in a rollable state. In the cross roller bearing 8, the raceway groove 8c is communicated with the outside of the device through a gap 8d between the outer ring 8a and the inner ring 8b. The gap 8d is sealed by an oil seal 16 accommodated between the outer ring 8a and the inner ring 8b.

There is also formed a gap portion 17 extending in the radial direction along the diaphragm 12b between the diaphragm 12b and the first unit end plate 5. The gap portion 17 has a radial inner end, which side is communicated with the inner space 12e of the circular cylindrical barrel part 12a of the externally toothed gear 12. The inner space 12e is an annular space formed between the cylindrical barrel part 12a and the circular outer peripheral surface of the hollow input shaft 2.

Here, as shown in FIGS. 1A and 1C, a plurality of grease-flowing holes 18 are formed in the radial middle section of the diaphragm 12b. In the present example, the grease-flowing holes 18 are eight circular through holes formed in the diaphragm 12b at equiangular intervals in the circumferential direction thereof. The second gap portion 15b on one side of the diaphragm 12b and the gap portion 17 on the opposite side thereof are communicated with each other via a plurality of grease-flowing holes 18. In a case in which the grease-flowing holes 18 are formed in the cylindrical barrel part 12a, the first gap portion 15a and the inner space 12e of the externally toothed gear 12 are communicated via the grease-flowing holes 18.

The operation of the strain wave gearing device 1 thus constituted will be explained. When the hollow input shaft 2 linked to a motor shaft (not shown) rotates, the wave generator 11 is rotated integrally therewith. This causes the meshing positions between the externally toothed gear 12 and the internally toothed gear 13 to move in the circumferential direction, and relative rotation between the two gears 12 and 13 is generated in accordance with the difference in the number of teeth between these gears. When the internally toothed gear 13 (the second unit end plate 6) is fixed, reduce-speed rotation is outputted from the externally toothed gear 12 (the first unit end plate 5). Conversely, when the externally toothed gear 12 (the first unit end pate 5) is fixed, reduced-speed rotation is outputted from the internally toothed gear 13 (the second unit end plate 6).

In the meshing section 14 of the externally toothed gear 12 with the internally toothed gear 13, the cylindrical barrel part 12a is repeatedly flexed in the radial direction as the wave generator 11 rotates. This flexion causes to generate pump effect in the meshing section 14 to push grease in the direction along the diaphragm 12b. The pushed grease flows toward the raceway groove 8c of the cross roller bearing 8 through the gap 15.

The second gap portion 15b of the gap 15 is communicated with the gap portion 17 on the opposite side of the diaphragm 12b via the grease-flowing holes 18. Part of the grease flowing the second gap portion 15b is going toward the raceway groove 8c and the remaining thereof flows into the opposite-side gap portion 17 via the grease-flowing holes 18. The grease flowed into the gap portion 17 is returned to the inner space 12e of the externally toothed gear 12. With the grease-flowing holes being formed, the amount of grease reaching the raceway groove 8c of the cross roller bearing 8 can be reduced. Accordingly, it is possible to prevent or suppress grease from leaking out to the outside of the device via the oil seal 16.

Embodiment 2

Figure 2:
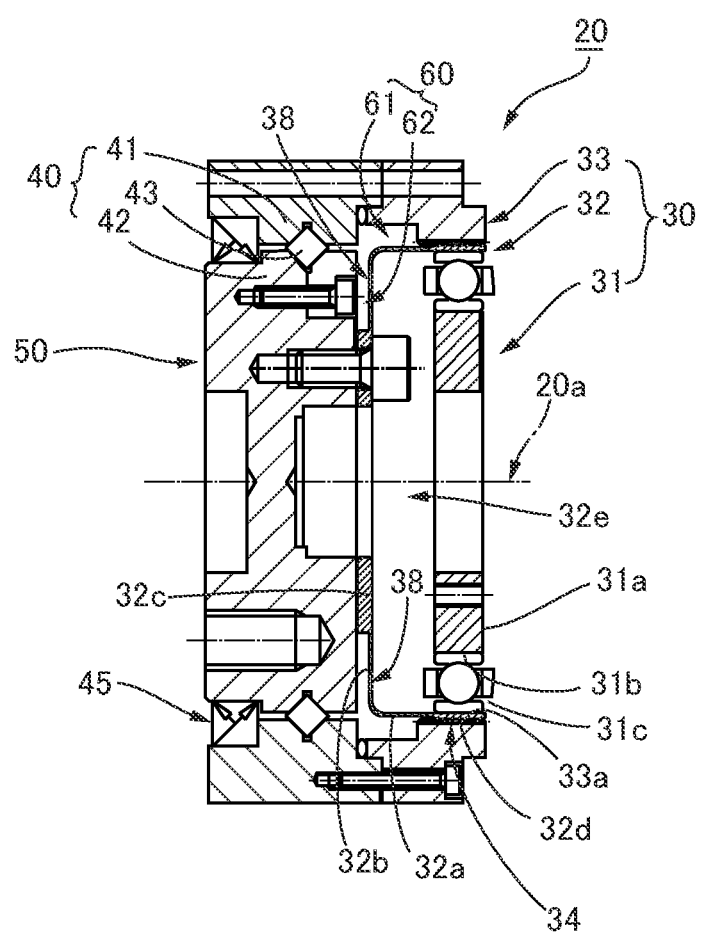
FIG. 2 is a schematic longitudinal cross-sectional view showing a unit-type strain wave gearing device according to Embodiment 2 of the present invention.

FIG. 2 is a schematic longitudinal cross-sectional view showing a unit-type strain wave gearing device of Embodiment 2 according to the present invention. In a unit-type strain wave gearing device 20 (hereinafter simply refers to as a "strain wave gearing device 20"), a strain wave gearing mechanism provided with a cup-shaped externally toothed gear is assembled.

The strain wave gearing device 20 is provided with a strain wave gearing mechanism 30, a cross roller bearing 40 and an output shaft 50. The strain wave gearing mechanism 30 is provided with a wave generator 31, a flexible externally toothed gear 32 which is flexed into a non-circular shape by the wave generator 31, and a rigid internally toothed gear 33 partially meshing with the externally toothed gear 32. In this example, the externally toothed gear 32 is flexed elliptically by the wave generator 31. The wave generator 31 is provided with an elliptical-contoured plug portion 31a and a wave bearing 31c mounted on the elliptical outer peripheral surface 31b of the plug portion 31a. The wave bearing 31c is provided with inner and outer rings which are flexible in the radial direction, and is flexed into an elliptical shape by the plug portion 31a.

The externally toothed gear 32 is of a cup shape and is provided with: a cylindrical barrel part 32a flexible in the radial direction; an annular diaphragm 32b extending inward in the radial direction from an end of the circular cylindrical barrel part 32a on the side of the output shaft 50; an annular rigid boss 32c formed as a continuation from the inner peripheral edge of the diaphragm 32b; and external teeth 32d formed in the outer peripheral surface portion on the other side of the circular cylindrical barrel part 32a. The wave generator 31 is positioned on the inner side of the section of the cylindrical barrel part 32a where the external teeth 32d are formed, and this section thereof is flexed into an elliptical shape by the wave generator 31. The external teeth 32d are meshed with internal teeth 33a of the internally toothed gear 33 on both ends of the major axis of the elliptically flexed cylindrical barrel part 32a. The meshing section 34 between the external teeth 32d and the internal teeth 33a is lubricated by grease. The meshing section 34 is coated or filled with a predetermined amount of grease (not shown) beforehand. In addition, the inner space 32e of the externally toothed gear 32 is also filled with grease, by which the sliding portion between the externally toothed gear 32 and the wave generator 31, and the wave bearing 31c and other portions of the wave generator 31 are lubricated.

The cross roller bearing 40 is disposed adjacent to the internally toothed gear 33 in the direction of the center axis line 20a. The cross roller bearing 40 has an outer ring 41 to which the internally toothed gear 33 is coaxially fixed by fastening bolts. The cross roller bearing 40 has an inner ring 42 which is integrally formed in the outer peripheral portion of the output shaft 50 in this example. Specifically, the inner ring 42 and the output shaft 50 are formed by a single component part. A gap between the outer ring 41 and inner ring 42 exposing to the outside of the device is sealed by an oil seal 45. The output shaft 50 is of a discoid shape and has an inner-side end face to which the boss 32c of the externally toothed gear 32 is coaxially fixed by fastening bolts. With this, the internally toothed gear 33 fixed to the outer ring 41 and the externally toothed gear 32 fixed to the output shaft 50 which is integrally formed with the inner ring 42 are made to be a state in which both gears can be rotate relative with each other.

A gap 60 is formed between the externally toothed gear 32 and the cross roller bearing 40. The gap 60 includes a first gap portion 61 and a second gap portion 62. The first gap portion 61 is formed between the externally toothed gear 32 and portions of the outer ring 41 and the internally toothed gear 32. The second gap portion 62 is formed between the externally toothed gear 32 and the inner ring 42. More specifically, the first gap portion 61 is formed between the outer peripheral surface of the cylindrical barrel part 32a of the externally toothed gear 32 and portions that are an end face portion of the outer ring 41 and an inner peripheral surface portion adjacent to the internal teeth 33a of the internally toothed gear 33, the first gap portion extending in the direction of the center axis line 20a along the cylindrical barrel part 32a. The first gap portion has one end which is communicated with the meshing section 34 of the external teeth 32d and the internal teeth 33a and has another end which is communicated with the raceway groove 43 between the outer ring 41 and the inner ring 42 and is also communicated with the second gap portion 62. The second gap portion 62 is formed between the diaphragm 32b and an annular inner-side end face of the output shaft 50 and extends in the radial direction along the diaphragm 32b. The radial outer end of the second gap portion 62 is communicated with the first gap portion 61.

A plurality of grease-flowing holes 38 are formed in the radial middle section of the diaphragm 32b of the externally toothed gear 32. In this example, the grease-flowing holes 38 are a plurality of circular through holes formed in the diaphragm 32b at equiangular intervals in the circumferential direction thereof. The second gap portion 62 and the inner space 32e of the externally toothed gear 32 are communicated with each other via a plurality of grease-flowing holes 38. The inner space 32e is a space formed between the cylindrical barrel part 32a and the wave generator 31. In a case in which the grease-flowing holes 38 are formed in the cylindrical barrel part 32a, the first gap portion 61 and the inner space 32e of the externally toothed gear 32 are communicated via the grease-flowing holes 38.

The operation of the strain wave gearing device 20 thus constituted will be explained. When the wave generator 31 is rotated by a motor (not shown), the meshing positions between the externally toothed gear 32 and the internally toothed gear 33 is caused to move in the circumferential direction. Relative rotation between the two gears 32 and 33 is generated in accordance with the difference in the number of teeth between these gears. The internally toothed gear 33 is set to be a stationary side, and reduce-speed rotation is outputted from the output shaft 50 linked to the externally toothed gear 32.

In the meshing section 34 of the externally toothed gear 32 with the internally toothed gear 33, the cylindrical barrel part 32a is repeatedly flexed in the radial direction as the wave generator 31 rotates. This flexion causes to generate pump effect in the meshing section 34 to push grease in the direction toward the diaphragm 32b. The pushed grease flows toward the raceway groove 43 of the cross roller bearing 40 through the first gap portion 61.

The first gap portion 61 is communicated with the inner space 32e of the externally toothed gear 32 via the second gap portion 62 and the grease-flowing holes 38. Part of the grease pushed out to the first gap portion 61 goes toward the raceway groove 43 and the remaining thereof returns to the inner space 32e of the externally toothed gear 32 passing through the second gap portion 62 and the grease-flowing holes 38. Since the amount of grease reaching the raceway groove 43 of the cross roller bearing 40 can be reduced, it is possible to prevent or suppress grease from leaking out to the unit outside via the oil seal 45.

The invention claimed is:

1. A unit-type strain wave gearing device comprising:
a rigid internally toothed gear;
a flexible externally toothed gear;
a bearing for supporting the internally toothed gear and the externally toothed gear in a relative rotatable state;
a wave generator;
grease which is coated on or filled in a meshing section of internal teeth of the internally toothed gear and external teeth of the externally toothed gear;
a gap which is formed between the bearing and the externally toothed gear and which communicates with the meshing section and a raceway groove of the bearing;
a grease-flowing hole formed in the externally toothed gear,
wherein
the externally toothed gear is of a top-hat shape and provided with: a cylindrical barrel part capable of flexing in a radial direction and disposed coaxially inside the internally toothed gear; and a diaphragm extending outward in a radial direction from a first end of the cylindrical barrel part, the external teeth being formed in an outer peripheral surface portion of the cylindrical barrel part which faces the internal teeth of the internally toothed gear;
the wave generator is disposed coaxially inside the cylindrical barrel part of the externally toothed gear and is configured to repeatedly flex the cylindrical barrel part in the radial direction so as to move a position of the external teeth meshing with the internal teeth in a circumferential direction;
the bearing has an inner ring located between the diaphragm and the internally toothed gear in an axial direction; and
wherein
the gap includes a first gap portion and a second gap portion;
the first gap portion is formed between the cylindrical barrel part of the externally toothed gear and the inner ring of the bearing, the first gap portion extending in the axial direction along an outer peripheral surface of the cylindrical barrel part and communicating with the meshing section;
the second gap portion is formed between the inner ring and the diaphragm and extends in a radial direction along the diaphragm;
the second gap portion has an inner end in the radial direction communicating with the first gap portion and has an outer end in the radial direction communicating with a raceway groove of the bearing; and
the grease-flowing hole is formed in the diaphragm so as to communicate between the second gap portion and an inner space of the cylindrical barrel part.

2. A unit-type strain wave gearing device comprising:
a rigid internally toothed gear;
a flexible externally toothed gear;
a bearing for supporting the internally toothed gear and the externally toothed gear in a relative rotatable state;

a wave generator;

grease which is coated on or filled in a meshing section of internal teeth of the internally toothed gear and external teeth of the externally toothed gear;

a gap which is formed between the bearing and the externally toothed gear and which communicates with the meshing section and a raceway groove of the bearing;

a grease-flowing hole formed in the externally toothed gear, wherein the externally toothed gear is of a cup shape and provided with: a cylindrical barrel part capable of flexing in a radial direction and disposed coaxially inside the internally toothed gear; and a diaphragm extending inward in a radial direction from a first end of the cylindrical barrel part, the external teeth being formed in an outer peripheral surface portion of the cylindrical barrel part which faces the internal teeth of the internally toothed gear;

the wave generator is disposed coaxially inside the cylindrical barrel part of the externally toothed gear and is configured to repeatedly flex the cylindrical barrel part in the radial direction so as to move a position of the external teeth meshing with the internal teeth in a circumferential direction; and the internally toothed gear and an outer ring of the bearing are disposed adjacent with each other in an axial direction; and wherein the gap includes a first gap portion and a second gap portion;

the first gap portion is formed between the cylindrical barrel part of the externally toothed gear and portions of the outer ring of the bearing and an inner peripheral surface of the internally toothed gear;

the second gap portion is formed between the diaphragm and an inner ring of the bearing;

the first gap portion extends in the axial direction along an outer peripheral surface of the cylindrical barrel part;

the first gap portion has one end in the axial direction communicating with the meshing section and has another end communicating with the raceway groove of the bearing;

the second gap portion extends in a radial direction along the diaphragm;

the second gap portion has an outer end in the radial direction communicating with the first gap portion; and the grease-flowing hole is formed in the diaphragm and communicates between the second gap portion and an inner space of the cylindrical barrel part.

* * * * *